Jan. 18, 1949.  P. F. SKOOG  2,459,295
APPARATUS FOR THE FLOW MANUFACTURE OF SHEET MATERIAL
Filed May 6, 1944  4 Sheets-Sheet 1
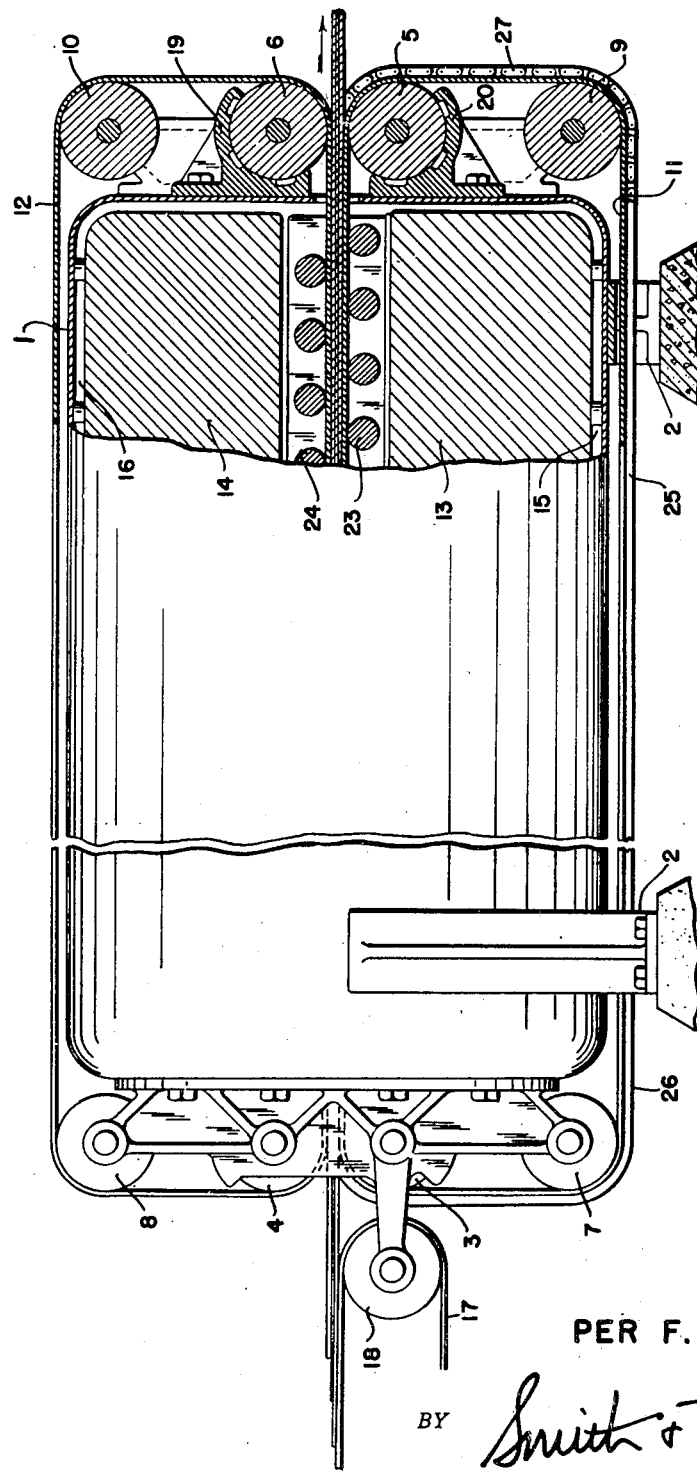
FIG—I
PER F. SKOOG
INVENTOR
BY *Smith & Tuck*
ATTORNEYS Jan. 18, 1949. P. F. SKOOG 2,459,295
APPARATUS FOR THE FLOW MANUFACTURE OF SHEET MATERIAL
Filed May 6, 1944 4 Sheets-Sheet 2
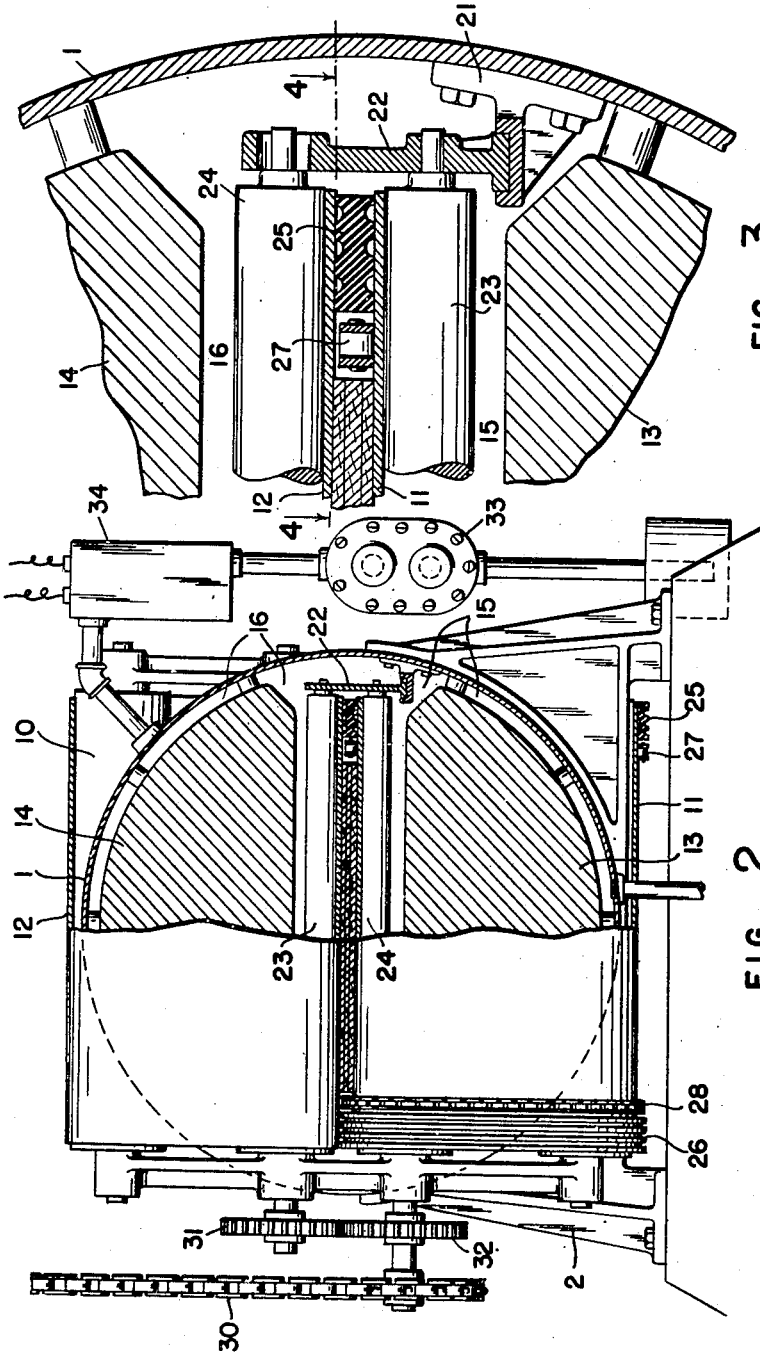
PER F. SKOOG
*INVENTOR*
BY *Smith & Tuck*
ATTORNEYS Jan. 18, 1949. P. F. SKOOG 2,459,295
APPARATUS FOR THE FLOW MANUFACTURE OF SHEET MATERIAL
Filed May 6, 1944 4 Sheets-Sheet 3
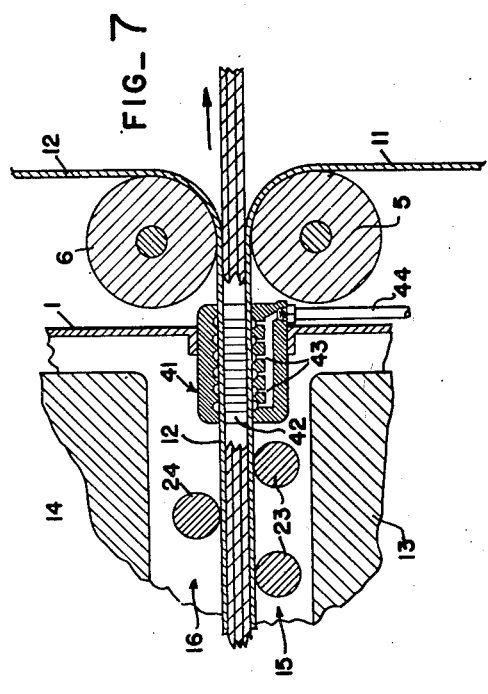
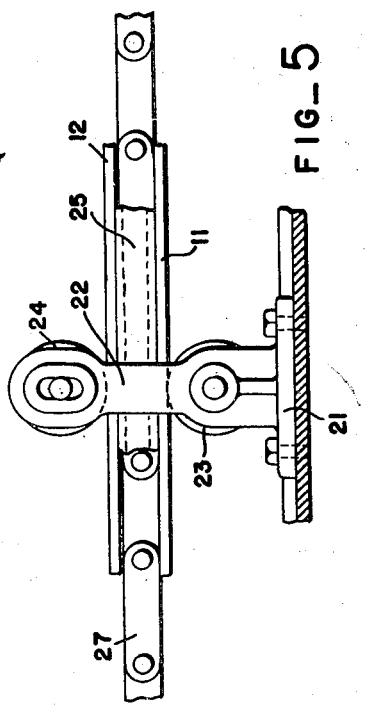
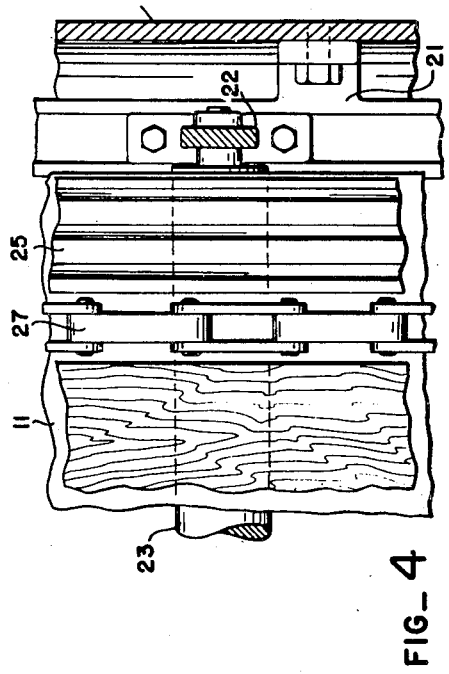
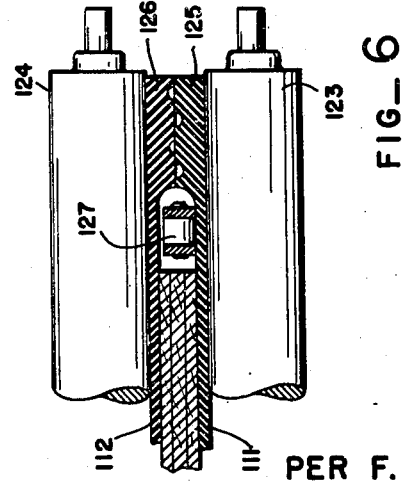
PER F. SKOOG
INVENTOR
BY
ATTORNEYS Jan. 18, 1949. P. F. SKOOG 2,459,295
APPARATUS FOR THE FLOW MANUFACTURE OF SHEET MATERIAL
Filed May 6, 1944 4 Sheets-Sheet 4
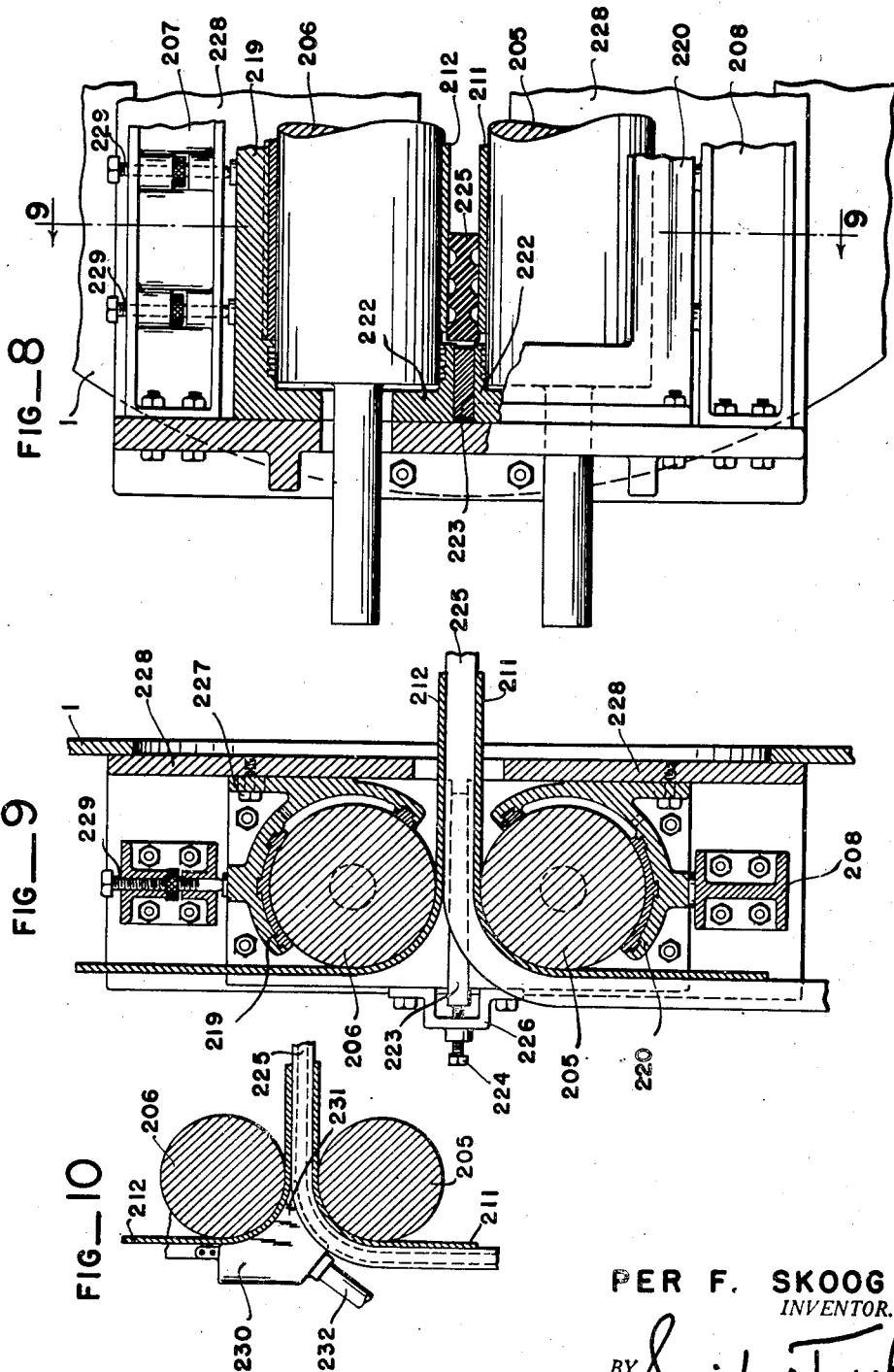
PER F. SKOOG
INVENTOR.
BY Patented Jan. 18, 1949

2,459,295

UNITED STATES PATENT OFFICE 2,459,295

APPARATUS FOR THE FLOW MANUFACTURE OF SHEET MATERIAL

Per F. Skoog, Olympia, Wash.

Application May 6, 1944, Serial No. 534,492

8 Claims. (Cl. 154—1)

The present invention relates to process and apparatus for the flow manufacture of sheet material and, in more particular, to a process and an apparatus for the area flow pressing of mats or laminae with bonding material to form a continuous multi-layered composite sheet.

In the prior art there have been presses which purport to be usable for the flow manufacture of plywood. Such presses have not found favor in the industry. Most of these presses embody an upper and a lower continuous belt, each of which has usually been made up of short rigid links having guides and rollers for their support with springs urging together opposed portions of the belts to clamp and press the plywood sheets therebetween.

The defects of these devices have been their weight, cost, many parts, joints, and bearings; heavy power requirements for operation of such cumbersome conveyors; and the difficulty of maintaining even and uniform pressures along the conveyors.

These defects in the previous flow presses have continued the manufacture of plywood as a step-by-step process. That is, the plywood is sliced from the log in a continuous sheet and then into small pieces, and from these pieces separate laminated boards are made having very limited dimensions, with the final boards being pressed in single or multiple platen presses during the setting of the bonding material.

The problem of flow manufacture, where line pressing suffices, is well solved in the manufacture of paper where pressure drums can be used, but drums cannot be used in the plywood industry where time is required to set the adhesive because the glued surfaces will tend to separate and destroy the bond when pressure is relieved. In the prior practices it was found impossible to continuously maintain stable pressures continuously with movement of the laminated composite sheet. Also it is necessary to avoid undesirable curving of the composite sheet. In plywood manufacture there must be area pressing. Many of these same problems of the plywood industry exist in the fiber-board, wall-board, and other industries. A solution of the plywood problem will be a solution of many other press problems.

Having in mind these defects of the prior art, it is an object of the present invention to devise a process for the area flow pressing of sheet material.

Another object of the present invention is to devise a hydraulic process and apparatus for the area flow pressing of sheet material.

Yet a further object of the present invention is the provision of a conveyor to which may be applied an even and constant hydraulic pressure over all of a selected area.

The defects of the prior art are remedied and the above mentioned objects and others are achieved by a process of sizing the material by passing it between pressure rolls and flowing a tubular envelope around the material to be pressed, guiding the envelope and material along a desired path of flow, and, while being so guided, establishing around the exterior sides of the envelope fluid under static pressure and, on occasion, subjecting the envelope and contents to heat. A preferred form of apparatus for carrying out this process is had by the use of a pressure cylinder, running two conveyors with their faces opposed through the cylinder along its longitudinal axis, carrying the outer portion of one conveyor over the cylinder, and the similar portion of the other under the cylinder, sealing the edges of the belts by interposing continuous sealing strips along each edge, providing suitable guide rollers inside and outside of the cylinder, and applying pressure to the conveyor by forcing a fluid into the cylinder. The fluid may be heated to aid in the treatment of the material. Reference to "the sides" of the envelope is to the entire outside except the ends which are open. The "pressure" referred to is any pressure above that on the inside of the envelope, usually above atmospheric pressure.

This preferred form of my invention as outlined above is shown in more detail in the accompanying drawings, in which:

Figure 1 is an elevational view partly in section of a press embodying my invention;

Figure 2 is an end view partly in section of the device shown in Figure 1;

Figure 3 is an enlarged sectional view of a portion of Figure 2;

Figure 4 is a view on the line 4—4 of Figure 3.

Figure 5 is a detailed elevational view of one of the guide units for the envelope;

Figure 6 is a detailed sectional elevational view of a modified form of the conveyor and its sealing means, Figure 7 is an enlarged detailed sectional view of a modified form of pressure sealing means employed at the adit and exit of the pressure cylinder, Figure 8 is an enlarged fragmentary view detailing an alternate form of pressure sealing means for the conveyor belts of my mechanism;

Figure 9 is a sectional view taken on line 9—9 of Figure 8; and

Figure 10 is a view detailing a fluid accumulator that may be used in my apparatus.

Figure 1 is an elevational view partly in section of a press embodying my invention in which is shown a closed-end pressure cylinder 1 mounted on suitable pedestals 2, and supporting on the outside thereof several belt or conveyor carrying rolls 3 to 10, inclusive. Around these rolls and through the cylinder along its longitudinal axis are arranged two conveyor belts 11, 12 with parts of the belt runs being in close proximity to each other within cylinder 1 and in opposition as shown in the drawings.

Inside the cylinder on opposite sides of the opposed conveyor flights are two plugs 13, 14 which take up most of the room therein but are separated from the walls of the cylinder and from the conveyor flights by free, or fluid pressure, passages 15, 16. A portion of a feed conveyor belt 17 is shown as passed around a roll 18 adjacent the entrance of the press.

The sealing rolls 3, 4, 5, 6 at the adit and exit of the pressure cylinder are backed up with sealing shoes 19, 20 which serve to prevent the leakage of the fluid pressure medium from within the cylinder. Suitable sealing guides, or platen, are arranged at the ends of the sealing rolls and at the edge of the belt between the end of the cylinder and the sealing rolls.

The entrance rolls 3, 4 serve as sizing rolls to apply an initial pressure to the batch of multiple sheet material or plywood laminae entering the press, to squeeze it and to bring it down to a desired size and shape, approximately that required for the finished article. As these rolls have a theoretical line contact with the material, very high pressures may be had on the multiple layers of material being treated.

Inside the container and on opposite walls thereof are arranged ledge hangers 21 which serve to support the conveyors. Resting on the hangers, are bearing posts 22 which have journalled therein the lower set of rolls 23 and the upper set of rolls 24. The lower set is fixedly bearinged in the hangers, while the upper set floats in the hangers so the set may rise and fall with various thicknesses of material passing through the press.

The edges of the belt are sealed by means of pressure strips 25, 26 which are in the form of continuous belt loops carried with the lower conveyor belt 11 but free therefrom. The upper and lower faces of the sealing strips have grooves which act as drains for any pressure fluid that may partially penetrate the seal. Adjacent the inner edge of each seal there is placed a chain 27, 28 which serves to center the material on the belt and to maintain an open drain or vent space between edges of the material being treated and the sealing belts. All belts and rolls are power-driven by suitable power supply means such as a chain 30 and gearing 31, 32 attached to the inlet or entrance rolls 3, 4.

Figures 2, 3, 4 and 5 show the details of the conveyor supporting structure and guide means arranged internally of the pressure cylinder.

Figure 6 illustrates a modification of the conveyor and sealing means shown in the previous figures. This figure shows lower guide rolls 123 and upper guide rolls 124 with a lower conveyor belt 111 and an upper conveyor belt 112. Attached to the lower conveyor 111 and integral therewith is a sealing member 125 having drain grooves on its upper surface. Attached to the upper conveyor 112 is a corresponding integral sealing member 126 with drain grooves on its lower face. The conveyors 111, 112 and the sealing strip 125, 126 may all be made out of rubber and formed in an integral piece. As in the principal form of the invention, there are chains 127, 128 which act as spacer means and means to maintain an open vent passage between the material being worked upon and the sealing strips of the conveyors.

In Figure 2 there is to be seen a geared fluid pump 33, driven by any suitable power means, which serves the function of supplying and maintaining fluid under pressure to the pressure cylinder. The pump may also be used for circulating fluid from the cylinder through a suitable heating means 34 and back into the cylinder.

Method of operation

The operation of the device shown in the figures in the drawings is as follows: a suitable light oil or other fluid is supplied by the pump 33 to the pressure casing 1. If the material being treated is plywood, the oil heat conditioned in the heater 34 is passed into the cylinder 1 to approximately 250 lbs. per sq. in. The conveyors 11, 12 are set in motion by the power source 30. The supply conveyor 17 is activated to carry suitably arranged laminae to form a desired plywood board. Preferably the components of this laminae arrive at the press properly glued and superimposed so as to form a continuous strip. It is this arrangement of a continuous strip either with continuous sheets of lamina making up the composite sheet or a large number of individual pieces arranged in overlapping relation to form a continuous sheet, which forms one of the desirable features of the present invention. Such an arrangement of small pieces to form a single large piece enables a more economical utilization of the component lamina. As the laminae moves between the entrance rolls 3, 4 pressure is exerted by these rolls to size the composite sheet and to spread and press the binder or adhesive across and along the sheets. From these sizing rolls 3, 4 the composite sheet enters the pressure cylinder where it is encased between the upper and lower belts 11, 12 to form an envelope around the material. The edges of the envelope are sealed by the endless sealing strips 25, 26. Chains 27, 28 act to space the laminated material from the seals and to allow a space for the venting of steam or the draining of any fluid which might there accumulate.

As the belt and the material travel or flow through the pressure cylinder, they are guided by the lower set of rolls 23 as well as the upper roll set 24. These upper rolls act mainly as a floating hold-down to maintain the belt and material in firm contact with the lower fixed set of rolls.

In the pressure cylinder, the belt and laminated material are subjected to a uniform overall pressure through the medium of the fluid contained in the cylinder under pressure furnished by the pump 33. In the case of plywood, the rate of travel, the pressure applied, and the temperature are all simply arranged so that when the material arrives at the outlet and passes out of the cylinder between the exit rolls 5, 6, the gluing or adhesive material is properly set and the finished product has reached a stable condition.

The upper set of rolls 24 is in no sense to be considered as a pressure means but only as suitable guide means for maintaining the material in the conveyor in a fixed path of travel. This path of travel can be arcuate if a curved sheet of plywood or other material is desired to be produced.

The filler blocks 13, 14 serve not only to reduce the total quantity of pressure fluid required but also as heat reservoirs to aid in maintaining a constant temperature in the pressure cylinder. These blocks 13, 14 are spaced from the walls of the pressure cylinder in order that all parts of the cylinder may be stressed or subjected to the same fluid pressure.

Figure 7 is an enlarged detailed sectional view of a modified form of pressure sealing means that may be employed at the adit and exit of the pressure cylinder. The seal is in general form a box 41 having an interior slot 42 to surround the envelope and its material as such enters and leaves the pressure cylinder. A box is placed in each end wall of the cylinder 1. On the inside face 42, or slot, of the sealing box 41, are arranged a series of grooves 43 that lie transversely of the direction of travel of the belts 11, 12. Each groove is continuous around the belts, or the inside of the slot 42. All of the grooves may be connected to a common drain 44. The size of each groove and its drain should be so proportioned that the leakage from the interior of the pressure cylinder is not all taken up by the first groove but that it is spread over several of the grooves. This allows each of the several grooves to exert a throttling effect upon the escaping fluid. The overall effect will be that very little fluid is lost through the seals even if the clearances between the belts and the seal are quite large. If this clearance is increased, then the length of the seal and the number of grooves will need to be increased. The lands between the grooves may have rubber inserts to act as squeeges, or wipers, to further seal the cylinder and to remove from the belts the liquid pressure medium, if such has been used. In fact, the whole seal 41 may be of a rubber compound.

Referring to Figures 8 and 9, wherein I illustrate an alternate mechanism for sealing the adit and exit parts of the pressure cylinder, the numerals 205 and 206 designate, respectively, the lower and upper rolls adjacent a port in the cylinder 1, over which pass belts 211, 212. Between adjacent edges of these belts is disposed the pressure sealing strip 225. Laterally across the cylinder on opposite sides of the end openings are the beams 207 and 208 lying adjacent to and backing up the sealing shoes 219 and 220 in which rolls 206 and 205 are mounted for rotation. Suitable fluid accumulator grooves are formed in shoes 219 and 220 to gather such fluid as may escape from within the cylinder. In practice the outer edge of belt 225 fills the space between belts and rolls, and between the belts and wedge 223 as well as edges of cups 222. Such leakage as may occur is accommodated by accumulator 230.

Shoes 219 and 220 have end cups 222 that cover the ends of the rolls, as shown in Figure 8, exterior of the edges of the belts 211, 212. Shoe 219 is movable relative shoe 220 to vary the spacing between the rolls and conveyor belts for the production of various thicknesses of plywood or other sheet material and the wedge 223 is employed to accommodate the resultant variable spacing of the cups. As shown in Figure 9 wedge 223 can be moved in or out by means of bolt 224 mounted in bracket 226.

In the preferred form shoe 220 is firmly supported immovably upon beam 208 and shoe 219 is movable by loosening bolts 227 passing through suitable slots into frame member 228. Adjustment screws 229 between shoe 219 and beam 207 are used to maintain the shoe in its adjusted positioning.

Figure 10 shows the fluid accumulator 230 having side tongues 231 insertable between belt 212 and pressure strip 225 to gather fluid that may pass outward in the grooves of the said strip. Such accumulated fluid is conveyed away by conduit 232 for return to the system or other disposal.

While I have shown and described particular embodiments of my invention, it will occur to those skilled in the art that various changes and modifications may be made without departing from the invention, and I, therefore, aim in the appended claims to cover all such changes and modifications as fall within the true spirit and scope of my invention.

Having thus described my invention I claim:

1. A press having two endless belts with portions thereof placed in opposition to form a flowing envelope, endless sealing strips flowing with said belts, each strip having a portion placed between opposed faces of said belts and adjacent the edges thereof, a pressure chamber around said envelope, and means for establishing fluid under pressure in said chamber and on the exterior sides of said envelope.

2. A press having two endless movable belts with portions thereof placed in opposition to form a flowing envelope, endless sealing strips flowing with said belts and each strip having a portion placed between opposed faces of said belts and adjacent the edges thereof, guide members maintaining a desired path of flow for the envelope, a pressure chamber around said envelope, and means for establishing a fluid under pressure within said chamber and on the exterior sides of said envelope while being so guided.

3. A press having two endless movable belts with portions thereof placed in opposition to form a flowing envelope, guide members maintaining a desired path of flow for the envelope, a pressure chamber around said envelope, and means for establishing a fluid under pressure within said chamber and on the exterior sides of said envelope while being so guided.

4. A press having two endless movable belts with portions thereof placed in opposition to form a flowing envelope, a pressure chamber around said envelope, and means for establishing a fluid under pressure within said chamber and on the exterior sides of said envelope.

5. A press having two endless movable belts with portions thereof placed in opposition to form a flowing envelope, endless sealing strips flowing with said belts and each strip having a portion placed between opposed faces of said belts and adjacent the edges thereof, a pressure chamber around said envelope, and means for establishing a fluid under pressure within said chamber and on the exterior sides of said envelope.

6. A press having two endless movable belts with portions thereof placed in opposition to form a flowing envelope, endless sealing strips flowing with said belt and each strip having a portion placed between opposed faces of said belts and adjacent the edges thereof, endless spacer and vent means between the edges of the material interposed between the endless movable belts of the envelope and the endless sealing strips flowing therewith, and means for establishing fluid under pressure on the exterior sides of said envelope.

7. A press having two endless movable belts with portions thereof placed in opposition to form a flowing envelope, endless spacer, seal and vent means between the side edges of material placed between said belts and the edges of the belts and flowing therewith, a pressure chamber around said envelope, and means for establishing fluid under pressure in said chamber and on the exterior sides of said envelope.

8. A press having two endless movable belts with portions thereof placed in opposition to form a flowing envelope; endless sealing strips flowing with said belts, each strip having a portion placed between opposed faces of said belts and adjacent the edges thereof; endless spacer and vent means between the edges of the material interposed between the endless movable belts of the envelope and the endless sealing strips flowing therewith; a pressure chamber around said envelope; and means for establishing fluid under pressure in said chamber on the sides of said envelope.

PER F. SKOOG.

REFERENCES CITED

The following references are of record in the file of this patent:

UNITED STATES PATENTS

| Number | Name | Date |
| --- | --- | --- |
| 1,740,989 | Lytle | Dec. 24, 1929 |
| 1,787,564 | Bausch, Jr. | Jan. 6, 1931 |
| 1,806,861 | Owen | May 26, 1931 |
| 1,909,444 | Worrall | May 16, 1933 |
| 2,135,763 | Nicholson | Nov. 8, 1938 |